United States Patent [19]
Shimrony

[11] 3,961,604
[45] June 8, 1976

[54] MAGNETIC TRIGGER DEVICE FOR TWO GROUP FUEL INJECTION SYSTEM

[75] Inventor: Yoram Shimrony, Givat-Shmuel, Israel

[73] Assignee: The Bendix Corporation, Southfield, Mich.

[22] Filed: Sept. 9, 1974

[21] Appl. No.: 504,615

[52] U.S. Cl.............. 123/32 EA; 335/205; 335/151; 200/19 M; 123/148 DK; 307/118
[51] Int. Cl.² ............ F02B 3/00; H01H 9/00
[58] Field of Search ....... 123/148 E, 32 EA, 32 AE, 123/148 OC, 148 DK; 335/205, 151, 153, 154; 200/19 M

[56] References Cited
UNITED STATES PATENTS

| | | | |
|---|---|---|---|
| 3,291,109 | 12/1966 | Neapolitakis | 123/148 E |
| 3,359,455 | 12/1967 | Koda | 123/148 E |
| 3,375,812 | 4/1968 | Koda | 123/148 E |
| 3,402,375 | 9/1968 | McLaughlin | 123/148 E |
| 3,456,628 | 7/1969 | Bassot | 123/32 EA |
| 3,587,536 | 6/1971 | Inoue | 123/32 EA |
| 3,675,635 | 7/1972 | Graser | 123/148 E |

*Primary Examiner*—Charles J. Myhre
*Assistant Examiner*—Ronald B. Cox
*Attorney, Agent, or Firm*—Russel C. Wells

[57] ABSTRACT

In a fuel injection controlled internal combustion engine, a magnetic trigger device provides the source of electrical timing signals for operating the injectors. A single rotating magnet has its magnetic field extended to an effective angular radiation area substantially greater than the angular radiation area of the magnet alone. A pair of magnetizable members are positioned on either side of the path of a rotating magnet for developing an enlarged magnetic field for actuating a single reed switch. The reed switch connects a source of power to a pair of signal lines wherein one line contains an inverter, whereby, the signal on one line is the complement of the signal on the other line.

2 Claims, 5 Drawing Figures

U.S. Patent   June 8, 1976   3,961,604
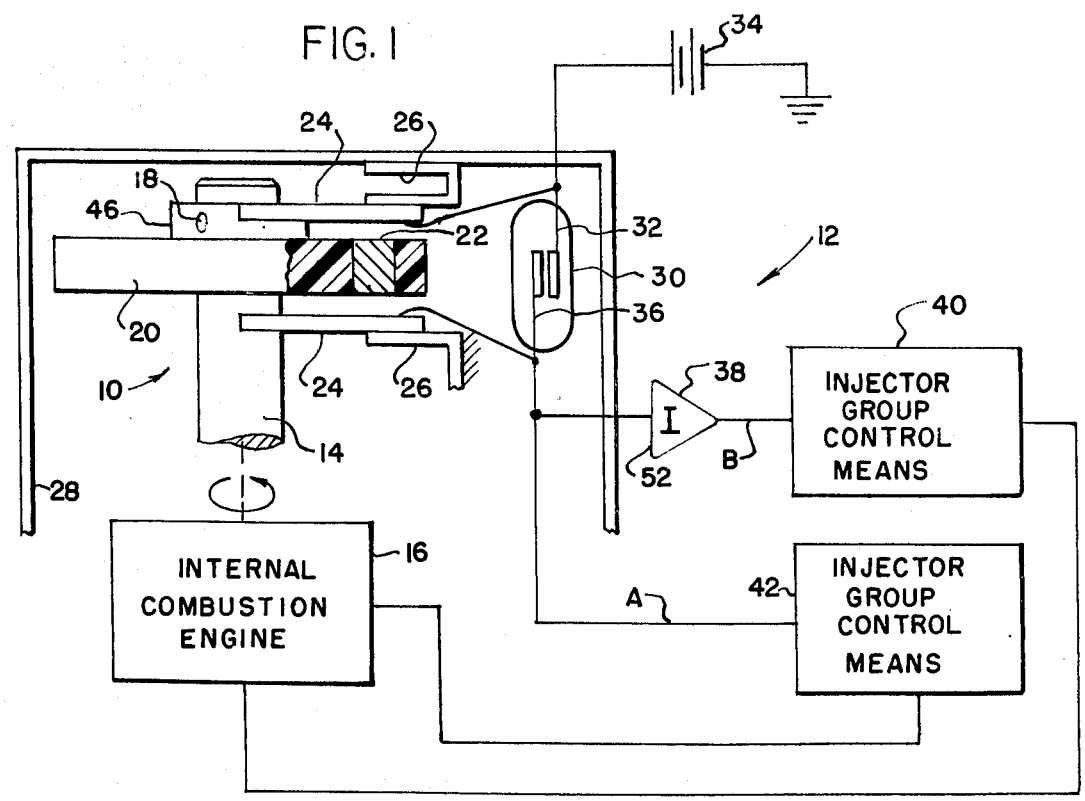
FIG. 1
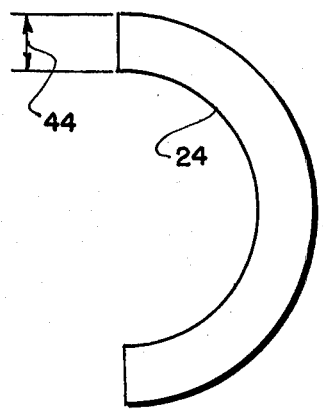
FIG. 2
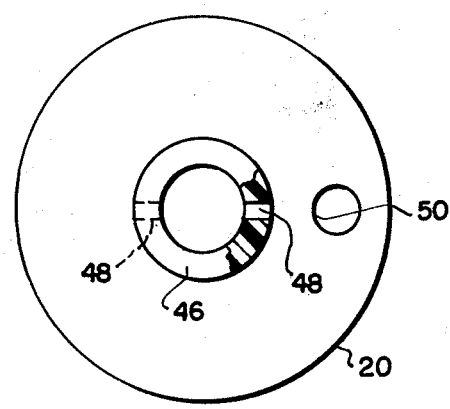
FIG. 4
FIG. 3
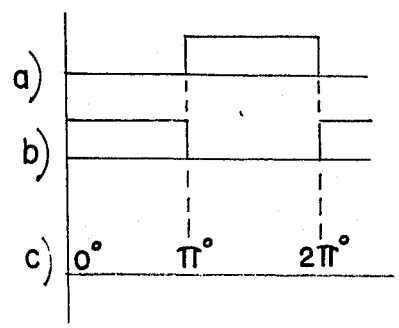
FIG. 5

MAGNETIC TRIGGER DEVICE FOR TWO GROUP FUEL INJECTION SYSTEM

BACKGROUND OF THE INVENTION

1. Field of the Invention

This invention in general relates to a magnetically actuated reed switch and more particularly to a magnetically actuated reed switch as used in timing systems for fuel injection internal combustion engines.

2. Prior Art

In the ignition systems of motor vehicles, more particularly in the distributor units, there has been attached to the distributor shaft an annular magnet having a plurality of angularly spaced alternating poles. A single reed switch is actuated by each magnetic pole as it passes by the switch, thereby causing an electrical circuit to operate and generate a signal for firing each spark plug. In each system there is required that either the number of poles of the magnet or the number of separate switches equal the number of pulses required per revolution of the distributor shaft.

The above system was further improved to provide a more definable electrical signal to each spark plug by encasing the reed switch with a copper bushing. The bushing forms a shorted turn to magnetic signals of higher frequency than that generated by the rotating magnet therefore reducing the sensitivity of the reed switch. This system still requires that the total number of either the magnets or switches equal the total number of pulses required per revolution of the distributor shaft.

Another system for use in an ignition distributor apparatus utilizes a stationary magnet spaced from a stationary switch and having a rotating shunt member pass between the magnet and the switch. The system requires a magnet and a switch combination for each pulse generator and the configuration of the shunt provides the timing of the signal generated.

Another system teaches a single movable magnet and a plurality of switches, one switch for each output signal line. As the magnet rotates past each switch, the switch is actuated and an electrical signal is generated. In this system there must be a number of magnets equal to the desired number of signals if there is one switch, or in the alternative with one magnet, there must be a plurality of switches equal to the number of signals desired.

SUMMARY OF THE INVENTION

It is a principal object of the present invention to generate complementary electrical signals for controlling two electrical loads from a single magnet and reed switch combination.

It is another object of the present invention to provide a trigger mechanism for generating the proper timing signals for each injector group in a two-group fuel injector system for internal combustion engines from a single magnet and reed switch combination having a built-in phase signal determination.

These and other objects will become apparent from the following drawings, detailed description and claims of a magnet timing device for a fuel injection system used on an internal combustion engine. A non-magnetic member is affixed to the distributor shaft of an internal combustion engine for rotation therewith. Secured in the member and positioned near its periphery is a bar magnet having its magnetic axis aligned parallel to the distributor shaft. The bar magnet has a cylindrical cross-sectional area substantially less than the cross-sectional area of the non-magnetic member.

A pair of magnetizable members are spaced on either side of the non-magnetic member and are shaped so as to overlie the path of rotation of the magnet. The members, in the preferred embodiment, are semi-circular in shape and operate to extend the magnetic influence of the bar magnet as it moves therebetween.

Positioned between the two magnetizable members, equally distant from either end and radially spaced from the rotating non-magnetic member, is a conventional reed switch. The switch is so positioned so as actuated when the magnet moves along the path between the two magnetizable members and deactuated when the magnet moves from between the members.

The reed switch is electricaly connected between a source of power and an inverter whereby the signal on the input to the inverter is supplied to one group of injectors and the complementary signal from the output of the inverter is electrically connected to the other group of injectors.

BRIEF DESCRIPTION OF THE DRAWINGS

In the drawings:

FIG. 1 is a schematic illustrating the magnetic trigger device and associated electrical circuit means;

FIG. 2 is a plan view of the magnetizable members shown in FIG. 1;

FIG. 3 is a plan view of the non-magnetic member shown in FIG. 1;

FIG. 4 is a perspective view of the preferred embodiment of the bar magnet of FIG. 1;

FIG. 5 is a timing diagram of the magnetic trigger device and schematic of FIG. 1.

DETAILED DESCRIPTION

Referring to the Figs. by the characteristic reference, there is illustrated in FIG. 1, the magnetic timing device 10 of the present invention including circuit means 12 for generating the required electrical signals. The magnetic timing device 10 comprises a rotatable shaft 14 operatively connected to the internal combustion engine 16 for rotation by the crankshaft therein. The rotatable shaft 14 may be the conventional distributor shaft as found on most internal combustion engines. Secured to the shaft 14 by means such as a pin 18 or a screw is a non-magnetic disc member 20. As shown, the non-magnetic disc member 20 is rotated by the shaft 14 operatively coupled to the crankshaft of the internal combustion engine 16. In the preferred embodiment, the rotational speed of the crankshaft is twice the speed of the shaft 14.

In the preferred embodiment there is positioned near the periphery of the non-magnetic disc member 20 a small cylindrical bar magnet 22, having its magnetic axis parallel to the axis of the shaft. The cross-sectional area of the bar magnet 22 is substantially less than the surface of cross-sectional area of the non-magnetic disc 20. Positioned in an overlying relationship to the non-magnetic disc 20 and on either side thereof is a pair of spaced-apart magnetizable members 24. The members 24 are supported by non-magnetic and electrically insulating bracket means 26 secured to the housing means 28 of the unit.

Positioned between the two magnetizable members 24 equally distant from either end and radially spaced from the non-magnetic disc 20 is a reed switch 30. The reed switch 30 is so positioned that when the magnet 22 moves along the path between the two magnetizable members 24, the switch 30 is actuated. The input on one contact 32 of the switch 30 is electrically coupled to a source of power 34 such as the battery shown and is magnetically connected to one of the members 24. The output or the other contact 36 of the switch is magnetically connected to the other member 24 and is electrically connected to the circuit means 12 including an inverter 38 and control means 40 and 42 for each injector group of the internal combustion engine 16.

Referring to FIG. 2, there is illustrated a plan view of the magnetizable members 24 of the preferred embodiment. As illustrated in FIG. 2, the members 24 are semi-circular in shape and have a width 44 which is approximately equal to the diameter or a diagonal dimension of the bar magnet 22. These magnetizable members 24 may be formed out of materials such as transformer core sheets or ferrites and function to extend the magnetic influence of the bar magnet 22. In addition each of these members 24 has means, not shown, for magnetically connecting the member to one of the contacts 32 or 36 of the reed switch 30.

Referring to FIG. 3, there is illustrated a plan view of the non-magnetic disc 20 of FIG. 1. In the preferred embodiment it comprises a collar 46 having an aperture means 48 for receiving a pin 18 to secure the disc 20 to the shaft 14. Alternate embodiments may well be a threaded hole for receiving a threaded member such as a set screw for adjustably holding the disc 20 to the shaft 14. As illustrated in FIG. 3, an aperture 50 is positioned near the periphery of the disc 20 for receiving the bar magnet 22 illustrated in FIG. 4. The non-magnetic disc 20 of FIG. 3 is fabricated from a plastic type material having good material stability over the extreme temperature range found in the environment and is not affected by the oil, grease, dirt, etc., also found in the environment.

In the preferred embodiment the bar magnet 22 is a cylindrical member having a circular cross section. However, any configuration of a magnet 22 may be used with the main consideration being the magnetic force developed by the bar magnet. The magnet 22 is polarized in a given polarity direction such that the poles of the magnet are at the surfaces normal to the axis of the magnet 22. The axis of the magnet is further positioned to be parallel to the rotational axis of the shaft 14. Thus, as the shaft 14 rotates, the magnet 22 moves along a circular path, which in the preferred embodiment moves through 180° between the pair of magnetizable members 24 and through 180° away from the magnetizable members 24 so that the duty cycle of the magnetic actuation of the reed switch 30 is 50%.

Referring to FIG. 5, there is illustrated a simplified timing diagram of the action of a normally open reed switch 30 which is closed when in the presence of a magnetic field source. FIG. 5A illustrates the waveshape found on Line (A) of FIG. 1, FIG. 5B represents a waveshape found on Line (B) of FIG. 1, and FIG. 5C illustrates the angular displacement of the magnet 22 relative to the rotation of the shaft 14 of FIG. 1.

When the magnet 22 moves between the pair of magnetizable members 24, the lines of force from the magnet 22 are coupled to the magnetizable members 24 and through the contacts 32 and 36. In the preferred embodiment the normally closed reed switch 30 is positioned so as to be actuated under the influence of the lines of force emanated from the magnet 22. When the reed switch 30 is actuated, it opens, placing a low signal at the input 52 of the inverter 38, which causes a high output signal from the inverter 30. This signal labeled (B) in FIG. 1 is supplied to one injector group control means 40 for processing, thereby to actuate one group of injectors in a fuel injection system of an internal combustion engine 16. When the magnet 22 moves along the path from between the two magnetizable members 24, the reed switch 30 is actuated to close, generating a high signal at the input 52 of the inverter 38, which results in a low output therefrom, thereby removing the trigger from the first injector group control means 40. However, the high signal is conveyed along Line (A) to the second injector group 42, thereby supplying a timing signal for firing or operating that particular group of injectors. Therefore, depending on the voltage level of the signal at the input 52 of the inverter 38, the particular phasing of the injector signals is determined.

Thus, as illustrated in FIG. 5, the signals on Line (A) and (B) are complementary signals and are generated by a single magnet 22 and a single reed switch 30. The magnet 22 cooperating with the two spaced-apart magnetizable members 24 effectively extend the magnetic influence of the magnet 22 through a rotation of 180° of the distributor shaft 14. Therefore, depending upon the duty cycle of the two waveshapes along Lines "A" and "B", the arcuate length of the two magnetizable members 24 is changed. Thus, there is shown a rotating disc 20 including a magnet 22 and a magnetic timing device including a pair of spaced magnetizable members 24 and a reed switch 30 for generating complementary timing signals for use in controlling two group injector systems in a fuel injection system for an internal combustion engine 16.

What is claimed is:

1. In a fuel injection system for an internal combustion engine a magnetic timing device for generating group timing signals to the injectors, said device comprising:

a rotatable shaft operatively coupled to the crankshaft of the engine;

a non-magnetic disc member connected to said shaft for rotating thereby;

a bar magnet having a cross-sectional area substantially less than said disc and located in said disc near the periphery thereof, said magnet positioned so that its magnetic axis is parallel to said shaft;

a pair of spaced apart magnetizable ferrite members, each of said members having an arcuate length of 180° and positioned for allowing said magnet to pass along a path therebetween during a revolution of said disc;

a reed switch positioned to be magnetically actuated by said magnet during the time said magnet is moving between said members, said switch having an input and an output;

a source of power electrically connected to the input of said reed switch; and a circuit means including two output lines electrically connected to the output of said switch and an inverter means for generating a first output signal on one output line when said switch is closed and through said inverter means for generating a second output signal when said switch is open.

2. The magnetic timing device according to claim 1 wherein said input and output contacts of said reed switch are respectively magnetically connected to said pair of spaced apart magnetizable members.

* * * * *